(12) United States Patent
Thomas et al.

(10) Patent No.: US 11,308,738 B2
(45) Date of Patent: Apr. 19, 2022

(54) MOBILE WORK MACHINE PERFORMANCE DETECTION AND CONTROL SYSTEM

(71) Applicant: Deere & Company, Moline, IL (US)

(72) Inventors: Douglas A. Thomas, Asbury, IA (US); Robert A. Hamilton, Raymond, IA (US)

(73) Assignee: Deere & Company, Moline, IL (US)

( * ) Notice: Subject to any disclaimer, the term of this patent is extended or adjusted under 35 U.S.C. 154(b) by 205 days.

(21) Appl. No.: 16/734,712

(22) Filed: Jan. 6, 2020

(65) Prior Publication Data

US 2021/0209870 A1 Jul. 8, 2021

(51) Int. Cl.
| | | |
|---|---|---|
| *G07C 5/06* | (2006.01) | |
| *G07C 5/08* | (2006.01) | |
| *A01D 41/12* | (2006.01) | |
| *E01C 23/12* | (2006.01) | |
| *E02F 9/20* | (2006.01) | |
| *E01C 23/08* | (2006.01) | |
| *A01D 41/127* | (2006.01) | |
| *E01C 23/088* | (2006.01) | |

(52) U.S. Cl.
CPC .............. *G07C 5/06* (2013.01); *G07C 5/0825* (2013.01); *A01D 41/127* (2013.01); *E01C 23/088* (2013.01); *E01C 23/127* (2013.01); *E02F 9/2025* (2013.01)

(58) Field of Classification Search
CPC ....... G07C 5/06; G07C 5/0825; E02F 9/2025; E01C 19/004; E01C 23/088; E01C 23/127; A01D 41/127
See application file for complete search history.

(56) References Cited

U.S. PATENT DOCUMENTS

| | | | | |
|---|---|---|---|---|
| 8,031,629 | B2* | 10/2011 | Stegmaier | G05D 1/0278 370/254 |
| 9,557,438 | B2 | 1/2017 | Wessling et al. | |
| 10,733,752 | B2* | 8/2020 | Hageman | E02F 9/2029 |
| 10,824,607 | B2* | 11/2020 | Xia | G06F 16/287 |
| 2007/0268852 | A1* | 11/2007 | Stegmaier | E01C 19/004 370/328 |

(Continued)

FOREIGN PATENT DOCUMENTS

| | | |
|---|---|---|
| DE | 69323943 T2 | 8/1999 |
| DE | 102019206817 A1 | 12/2019 |

OTHER PUBLICATIONS

German Search Report issued in counterpart application No. 102020214893.7 dated May 20, 2021 (10 pages).

(Continued)

*Primary Examiner* — Tyler J Lee
(74) *Attorney, Agent, or Firm* — Christopher J. Volkmann; Kelly, Holt & Christenson, PLLC

(57) ABSTRACT

A mobile work machine includes a sensor configured to generate a sensor signal indicative of operation of the mobile work machine, a machine performance detection system configured to receive the sensor signal, generate a topological representation of the sensor signal, and determine a machine performance characteristic based on the topological representation relative to a reference model, and a control system configured to generate a control signal to control the mobile work machine based on the machine performance characteristic.

20 Claims, 15 Drawing Sheets

(56) References Cited

U.S. PATENT DOCUMENTS

| | | | | |
|---|---|---|---|---|
| 2009/0089108 A1* | 4/2009 | Angell | ............ | G06Q 10/00 |
| | | | | 705/7.28 |
| 2015/0348388 A1* | 12/2015 | Teller | ............ | B60Q 1/2611 |
| | | | | 340/937 |
| 2017/0314381 A1* | 11/2017 | Vandapel | ............ | G01C 11/12 |
| 2018/0035622 A1* | 2/2018 | Gresch | ............ | A01G 22/00 |
| 2019/0026914 A1* | 1/2019 | Hageman | ............ | E02F 9/2029 |

OTHER PUBLICATIONS

Chazal et al., "An introduction to Topological Data Analysis: fundamental and practical aspects for data scientists", Oct. 12, 2017, 38 pages.

\* cited by examiner

PERSISTENCE DIAGRAM

MOBILE WORK MACHINE PERFORMANCE DETECTION AND CONTROL SYSTEM

FIELD OF THE DESCRIPTION

The present description generally relates to mobile work machines. More specifically, but not by limitation, the present description relates to a machine performance detection and control system for a mobile work machine based on topological analysis of sensor signals.

BACKGROUND

There are many different types of mobile work machines. Those mobile work machines can include agricultural machines, construction machines, turf management machines, forestry machines, among others. Many of these pieces of mobile equipment have subsystems that are controlled by an operator and/or automatically in performing operations. Agricultural examples include machines such as a combine or harvester, a baler, a row unit planter, an air seeder, a sprayer, to name a few. Some construction examples include machines such as an articulated dump truck, a wheel loader, a grader, an excavator, a scraper, an asphalt milling machine, to name a few. Construction machines are often tasked with transporting material across a worksite, or into or out of a worksite, in accordance with a worksite operation. Different worksite operations may include moving material from one location to another or leveling a worksite, etc.

The subsystems of a mobile work machine can have a variety of machine components or parts. Often, a number of these components are interchangeable or replaceable. Examples of replaceable components include parts such as wheels, tires, tracks, bearings, valves, batteries, or any of a wide variety of other types of parts that wear or deteriorate with usage over time. Many of these parts have a predefined service life or expected lifecycle after which the parts are to be serviced or replaced.

The discussion above is merely provided for general background information and is not intended to be used as an aid in determining the scope of the claimed subject matter.

SUMMARY

A mobile work machine includes a sensor configured to generate a sensor signal indicative of operation of the mobile work machine, a machine performance detection system configured to receive the sensor signal, generate a topological representation of the sensor signal, and determine a machine performance characteristic based on the topological representation relative to a reference model, and a control system configured to generate a control signal to control the mobile work machine based on the machine performance characteristic.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present description generally relates to mobile work machines. More specifically, but not by limitation, the present description relates to a machine performance detection and control system for a mobile work machine based on topological analysis of sensor signals.

Figure 1:
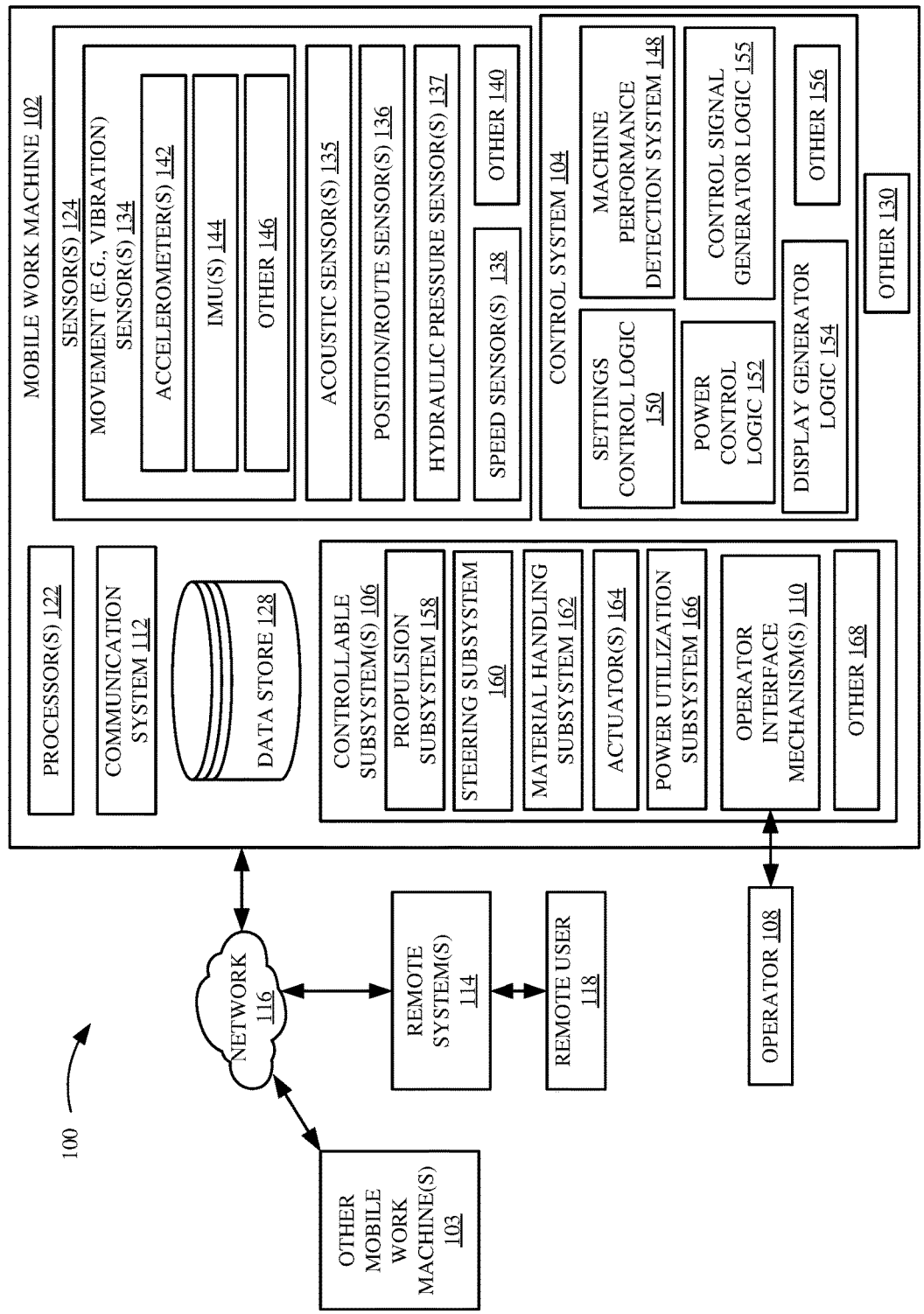
FIG. 1 is a block diagram of one example of a mobile work machine architecture.

FIG. 1 is a block diagram showing one example of a work machine architecture 100 that includes a mobile work machine 102. Work machine 102 includes a control system 104 configured to control a set of controllable subsystems 106 that perform operations on a worksite. For instance, an operator 108 can interact with and control work machine 102 through operator interface mechanism(s) 110. Operator interface mechanism(s) 110 can include such things as a steering wheel, pedals, levers, joysticks, buttons, dials, linkages, etc. In addition, they can include a display device that displays user actuatable elements, such as icons, links, buttons, etc. Where the device is a touch sensitive display, those user actuatable items can be actuated by touch gestures. Similarly, where mechanism(s) 110 includes speech processing mechanisms, then operator 108 can provide inputs and receive outputs through a microphone and speaker, respectively. Operator interface mechanism(s) 110 can include any of a wide variety of other audio, visual or haptic mechanisms.

Work machine 102 includes a communication system 112 configured to communicate with other systems or machines in architecture 100. For example, communication system 112 can communicate with other local machines, such as other machines operating on a same worksite as work machine 102. In the illustrated example, communication system 112 is configured to communicate with one or more remote systems 114 over a network 116. Network 116 can be any of a wide variety of different types of networks. For instance, it can be a wide area network, a local area network, a near field communication network, a cellular communication network, or any of a wide variety of other networks, or combinations of networks.

Communication system 112 can include wireless communication logic, which can be substantially any wireless communication system that can be used by the systems and components of machine 102 to communicate information. In one example, communication system 112 communicates over a CAN bus (or another network, such as an Ethernet network, etc.) to communicate information. This information can include the various sensor signals and output signals generated based on the sensor variables and/or sensed variables.

A remote user 118 is illustrated as interacting with remote system 114, which can be a wide variety of different types of systems. For example, remote system 114 can be a remote server environment, remote computing system that may be used by remote user 118, such as to receive communications from or send communications to mobile work machine 102 through communication system 112. Further, it can be a remote computing system, such as a mobile device, remote network, or a wide variety of other remote systems. Remote user 118 can receive communications, such as notifications, requests for assistance, etc., from work machine 102 on a mobile device. Remote system 114 can include one or more processors or servers, a data store, and it can include other items as well.

FIG. 1 also shows that work machine 102 includes one or more processors 122, one or more sensors 124, a data store 128, and can include other items 130 as well. Sensor(s) 124 can include any of a wide variety of sensors depending on the type of work machine 102. For instance, sensors 124 can include movement (e.g., vibration) sensor(s) 134, acoustic sensor(s) 135, position/route sensor(s) 136, hydraulic pressure sensor(s) 137, speed sensor(s) 138, and can include other sensor(s) 140 as well.

Movement sensor(s) 134 are configured to sense movement of component(s) of work machine 102. For example, movement sensor(s) 134 sense vibration of a frame or other structural components associated with controllable subsystem(s) 106. Sensor(s) 134 can include one or more accelerometers 142, inertial measurement unit(s) (IMU(s)) 144, or other types of sensors 146.

Acoustic sensors 135 are configured to generate sensor signals indicative of sensed acoustic signals generated by machine 102 during operation. For example, a microphone can be utilized to detect sound created by operation of material handling system 162 or other controllable subsystems 106 of work machine 102.

Position/route sensors 136 are configured to identify a position of work machine 102 and a corresponding route (e.g., heading) of work machine 102 as it traverses the worksite. Sensors 136 include sensors configured to generate signals indicative of an angle or turn radius of machine 102. This can include, but is not limited to, steering angle sensors, articulation angle sensors, wheel speed sensors, differential drive signals, gyroscopes, to name a few.

Hydraulic pressure sensor(s) 137 sense a pressure of hydraulic system(s) on machine 102. Speed sensors 138 are configured to output a signal indicative of a speed of one or more of controllable subsystems 106. For example, this can include a speed of propulsion system 158 (e.g., a speed of traction elements, thus indicative of a speed at which work machine 102 is traversing a worksite). In another example, the speed detected by sensor(s) 138 comprises a speed of components in material handling system 162. For example, in the case of an asphalt cold miller, a speed of a milling drum is detected.

Control system 104 includes a machine performance detection system 148 configured to detect performance of machine 102 based on topological analysis of sensor signals (e.g., input signals from sensor(s) 124). This is discussed in further detail.

Briefly, however, system 148 is configured to receive signals (e.g., indicative of vibration of a particular subsystem 106) from sensors 134 mounted on or in proximity to the controllable subsystems 106. These signals are processed by system 148 using topological data analysis to detect an anomalous operating condition. Based on the detection of the anomalous operating condition, system 148 can identify operational characteristics of the subsystem 106, such as wear or deterioration of machine component(s), erroneous, improper or sub-optimal settings, etc. Further, system 148 can identify any corrective actions and generate corresponding machine control signals to control machine 102, or other systems in architecture 100.

Control system 104 also includes settings control logic 150, power control logic 152, display generator logic 154, control signal generator logic 155, and it can include other items 156. Control signal generator logic 155 is configured to generate a control signal to control mobile work machine 102 and/or other systems or machines in architecture 100. For example, settings control logic 150 can use logic 155 to generate a control signal to change the settings of machine 102. In another example, display generator logic 154 uses logic 155 to generate a control signal to control a display device to render an output to operator 108. Controllable subsystems 106 can include propulsion subsystem 158, steering subsystem 160, material handling subsystem 162, one or more different actuators 164 that can be used to change machine settings, machine configuration, etc., power utilization subsystem 166, and it can include a wide variety of other systems 168, some of which are described below. In one example, controllable subsystems 106 include operator interface mechanism(s) 110, such as display devices, audio output devices, haptic feedback mechanisms, as well as input mechanisms. Examples are discussed in further detail below.

Settings control logic 150 can control one or more of subsystems 106 in order to change machine settings, for example based on machine performance detection system 148. By way of example, settings control logic 150 can actuate actuators 164 that change the operation of material handling subsystem 162, propulsion subsystem 158, and/or steering subsystem 160.

Power control logic 152 generates control signals to control power utilization subsystem 166. For instance, it can allocate power to different subsystems, generally increase power utilization or decrease power utilization, etc. These are just examples and a wide variety of other control systems can be used to control other controllable subsystems in different ways as well.

Display generator logic 154 illustratively generates a control signal to control a display device, to generate a user interface display for operator 108. The display can be an interactive display with user input mechanisms for interaction by operator 108.

As noted above, mobile work machine 102 can take a wide variety of different forms. For example, mobile work machine 102 can comprise a construction machine, such as a bulldozer, motor grader, crane, front loader, excavator, dump truck, cold asphalt grinder or miller, to name a few. In another example, mobile work machine 102 can include an agricultural machine, such as a tractor, combine, planter, seeder, sprayer, to name a few.

Figure 2:
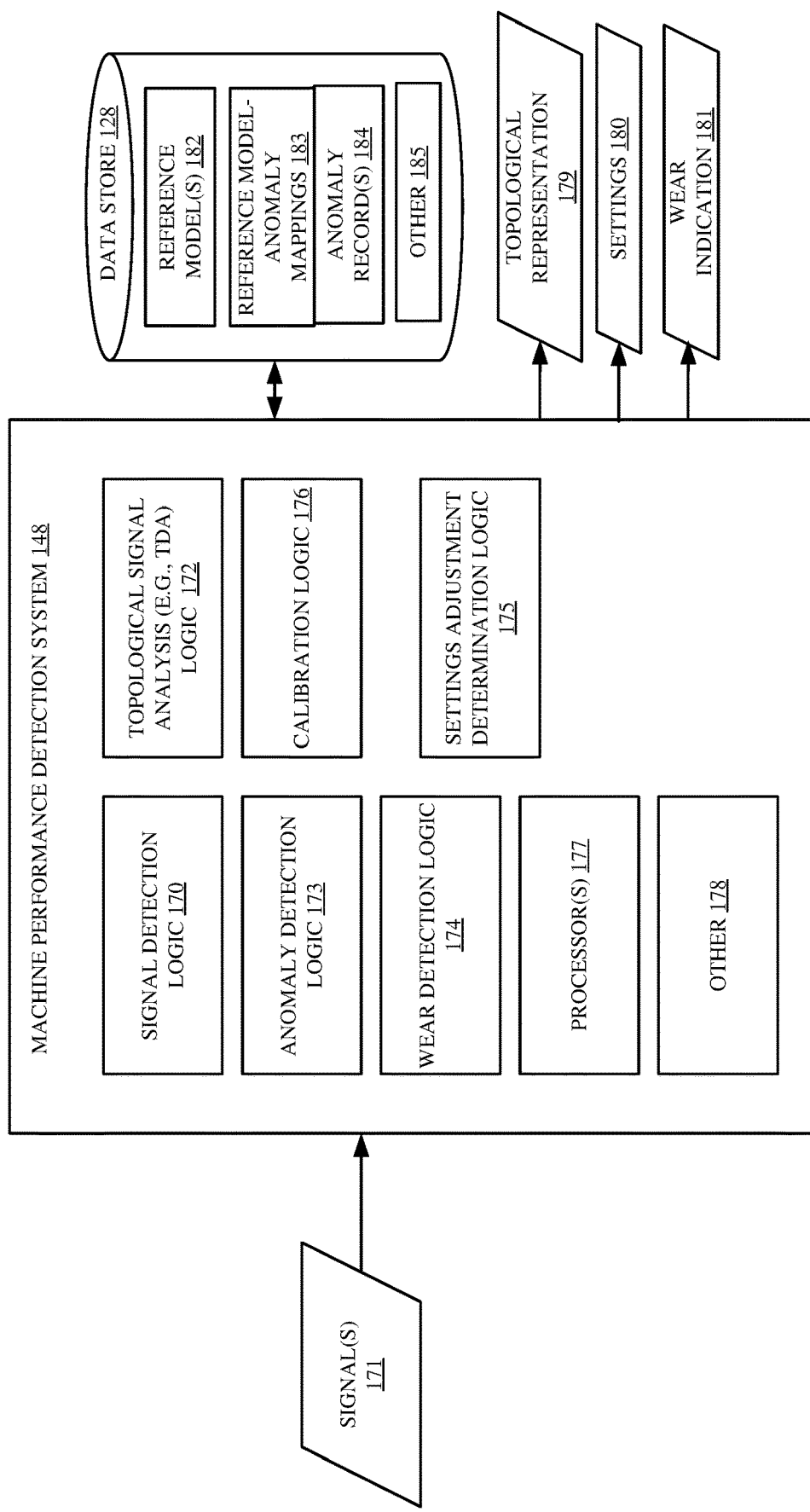
FIG. 2 is a block diagram of one example of a machine performance detection system.

FIG. 2 is a block diagram of one example of machine performance detection system 148. System 148 is configured to detect performance of mobile work machine 102 based on input signals received from sensors associated with machine 102. Before discussing operation of system 148 in further detail, a brief overview of components of system 148 will be provided.

In the illustrated example, system 148 includes signal detection logic 170 configured to detect signal(s) 171 from sensors 124. Signals 171 indicate operation of machine 102 and can be received from any of a wide variety of different types of sensors.

For example, signals 171 can indicate vibration of components of machine 102, received from vibration sensors. In another example, signals 171 can indicate sound detected by acoustic sensors.

Two or more accelerometers 142 can be utilized to detect multi-dimensional vibration along a plurality of different axes. In another example, signals 171 can include inputs from hydraulic pressure sensors and/or machine speed sensors, which detect operation of components of machine 102.

System 148 includes topological signal analysis logic 172 configured to perform topological analysis on signal(s) 171, to determine a topology, or structure, of the signal data. In one example, logic 172 uses topological data analysis ("TDA") to analyze signals 171 and determine machine performance based on those signals. This is discussed in further detail below.

Briefly, however, TDA provides an analysis technique that represents the data as a geometric entity (e.g., surface, volume, manifold) and performs geometric/topological analysis on this representation of the data. This approach provides the analysis of data sets using techniques from topology, e.g., geometric reasoning to structure the data and allow measures of similarity or difference to be evaluated on a geometric representation of signal 171. This facilitates application of tools of topology for qualitative geometric feature analysis, such as smoothness and connectedness, to analyze datasets that are often large and high-dimensional, but can also have incomplete parts and/or be noisy. Otherwise unseen insights into the data can thus be obtained through the topological analysis.

A topological representation of sensor signal 171 models a shape or structure of sensor signal 171 over time. The sensor signal defines a time series of feature values, and the topological representation is generated by applying a topological data analysis algorithm to the time series of feature values, to model changes in the feature values over time. Anomaly detection logic 173 is configured to detect anomalies in the performance of machine 102 based on the topological representation. Logic 173 is configured to detect or otherwise characterize normal operation of machine 102, as well as anomalous operational conditions.

For sake of illustration, but not by limitation, some mobile work machines have interchangeable/replaceable wear parts with relatively short service life. For example, an asphalt cold milling machine is discussed below with respect to FIG. 7. Briefly, however, an asphalt milling machine has milling teeth that wear quickly during use, in some instance within a day to a week. It can be difficult to determine when the teeth have degraded or worn to a point that requires replacement. Often, a trained operator is required to detect the wear condition of the teeth through physical observance of the performance of the machine. For example, the operator attempts to infer the condition of the milling teeth based on physically observing changes in machine vibration and/or sound over time. This is often very inaccurate, if at all possible, to determine even by very experienced operators.

Using topological signal analysis, system 148 can determine performance of machine 102 based on changes or shifts in input signal 171 over time. Based on this determination, anomaly detection logic 173 identifies an anomalous operating condition, e.g., when the signal has shifted or changed by a threshold amount.

Accordingly, system 148 can include wear detection logic 174 and/or settings adjustment determination logic 175. Logic 174 is configured to determine that component(s) of machine 102 have reached a wear state that requires corrective action, such as by replacing the wear parts, etc. In some cases, the anomalous operating condition may not be a result of wear or deterioration, but is instead caused by incorrect or sub-optimal machine settings. For example, the milling drum on an asphalt milling machine may be set at an incorrect speed. In this case, logic 175 can determine, based on the detected anomaly, a corrective action that includes the changing of machine settings, such as machine speed, actuator position, down pressure, or any of a wide variety of settings depending on the type of machine 102.

Calibration logic 176 is configured to calibrate system 148. This can include, but is not limited to, obtaining reference models to which the topological representation generated by logic 172 is compared, as well as determining topological distance or difference thresholds, that are used in triggering anomaly detection by logic 173. These of course, are for sake of example only. System 148 is also illustrated as including one or more processors 177, and can include other items 178 as well.

The topological representation generated by logic 172 (and/or the results of analyzing the topological representation) can be output to other components of machine 102, to other mobile work machines 103, to remote system 114, etc. This is represented in FIG. 2 at reference numeral 179. Alternatively, or in addition, the setting adjustments determined by logic 175 can be outputted to settings control logic 150 for automatic adjustment of settings of subsystems 106. This is represented by reference numeral 180. In another example, settings adjustments 180 can be output to operator 108 as suggested changes to be made through operator interface mechanisms 110. Further yet, a wear indication 181 can be output by wear detection logic 174, for example as an indication to operator 108 through operator interface mechanisms 110, to remote user 118 through remote system 114, or otherwise.

The reference models generated by, or otherwise utilized by, calibration logic 176 can be stored in data store 128, as represented by block 182. As discussed in further detail below, an example reference model provides a reference topological representation for a given input signal 171. For instance, the reference model can model a known failure mode of material handling subsystem 162. Reference model-anomaly mappings 183 map the reference models 182 to a corresponding anomaly record 184, which identifies any of a variety of information associated with a particular anomaly. For example, it can identify a root cause of a given anomaly, such as by mapping the reference model to a worn tooth state for a cold miller. An anomaly record 184 can also identify corrective actions to be taken for the given anomaly. Of course, data store 128 can store other items 185 as well.

Figure 3A:
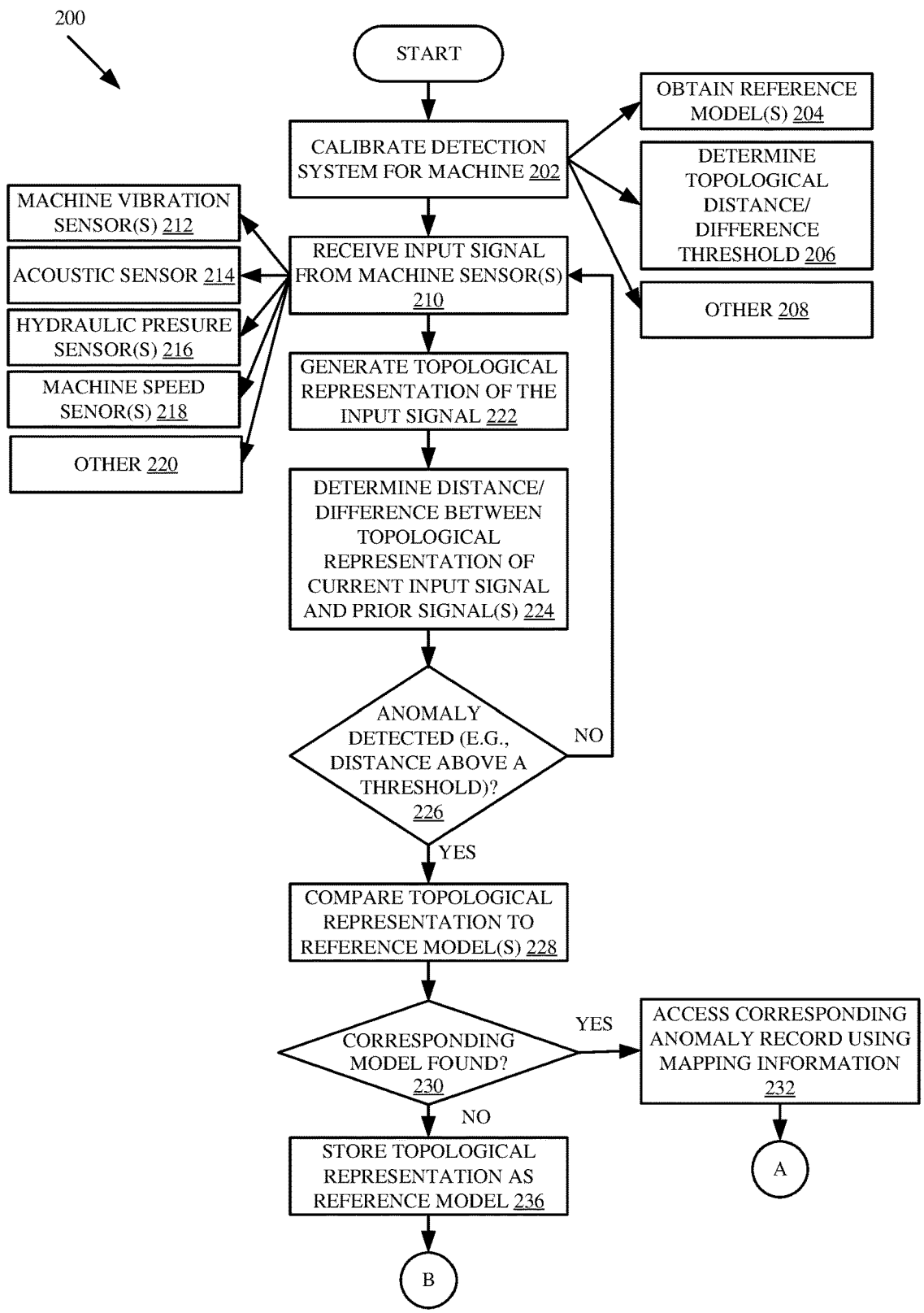
FIGS. 3A and 3B are a flow diagram of an example operation that detects machine performance using topological analysis of input signals from sensors on a work machine.
Figure 3B:
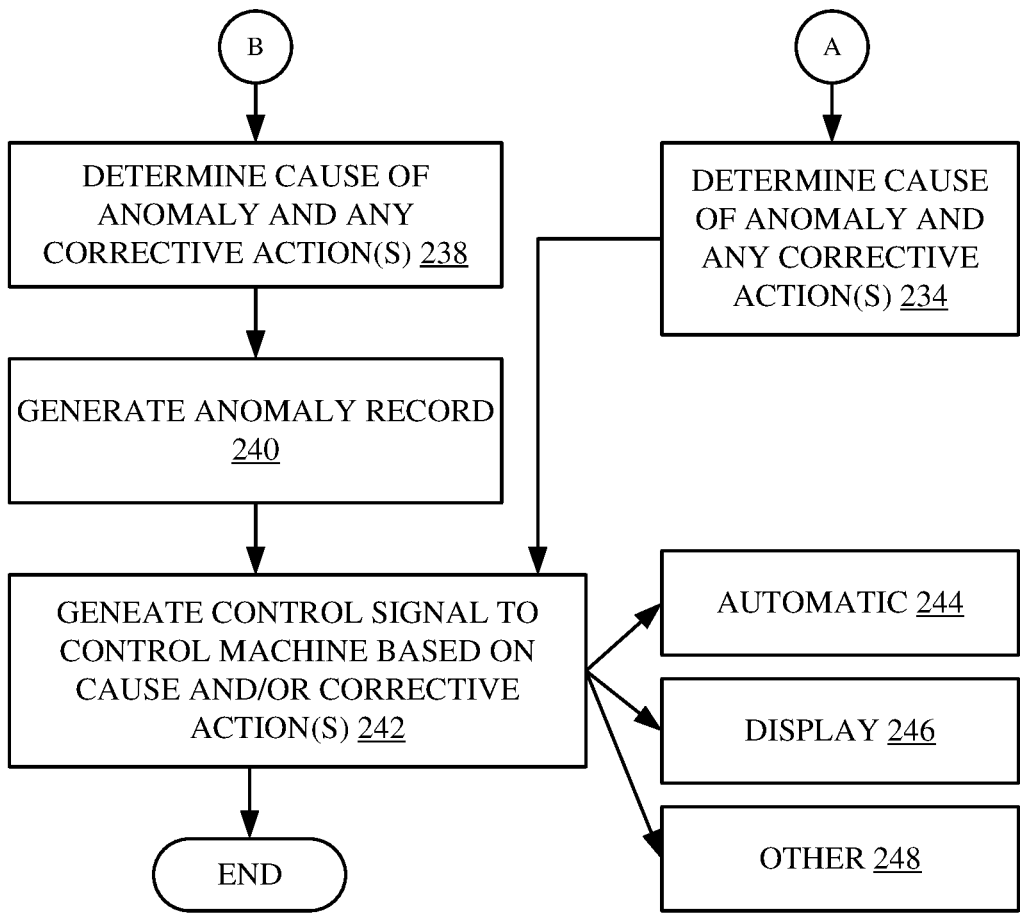

FIGS. 3A and 3B (collectively referred to as FIG. 3) is a flow diagram 200 of an example operation that detects machine performance using topological analysis of input signals from sensors on a work machine. For sake of illustration, but not by limitation, FIG. 3 will be described in the context of system 148 illustrated in FIG. 2 detecting performance of machine 102 illustrated in FIG. 1.

At block 202, system 148 is calibrated for machine 102. This calibration can be performed at any of a wide variety of times. For instance, the calibration at block 202 can be performed prior to each operation of machine 102 at a worksite. The calibration can include obtaining reference models (block 204), determining topological distance/difference thresholds (block 206), etc. The reference models obtained at block 204 model anomalous machine operating conditions (e.g., known failure modes, etc.). A reference model, in one example, models an input signal that matches one of these anomalous conditions. For instance, in the case of vibration sensors on an asphalt cold miller, a reference model models the structure or shape of input signals from the vibration sensor when the milling teeth have worn or degraded past a threshold at which the teeth are to be replaced. In another example of an excavator, a reference model models the structure of an input signal from a vibration sensor when the swing bearing on an excavator is worn. In yet another example, a reference model can model vibration for drive train components with gear damage, degradation of a tractor power takeoff (PTO) system, etc. These, of course, are by way of example only.

The topological distance/difference threshold at block 206 is utilized to determine when a change to the shape or structure of the input signal has significantly changed to a point in which a determination is to be made that an anomalous operating condition is present.

Of course, system 148 can be calibrated in other ways as well. This is represented at block 208. At block 210, input signal (e.g., signal(s) 171) is received by signal detection logic 170. As noted above, the signals can be received from any of a wide variety of different types of sensors. For example, this can include one or more machine vibration sensors (block 212). In one example, multiple accelerometers are configured to detect vibration along multiple axes. In another example, an input signal can be received from an acoustic sensor. This is represented at block 214. In addition to detecting vibration directly, machine vibration can also be detected indirectly or by proxy. For example, fluctuations in hydraulic pressure sensed by hydraulic pressure sensors (block 216) and/or motor speed (represented by block 218) can also be detected. Of course, the input signal can be received from machine sensors in other ways as well. This is represented at block 220.

At block 222, a topological representation of the input signal is generated. In one example discussed in further detail below, topological data analysis is performed on the input signal. The topological representation generated at block 222 models the shape of the sensor signal over time. For instance, the sensor signal defines a time series of feature values, and the topological representation is generated by applying a topological data analysis algorithm to the time series of feature values. This can include generating a persistence model that models persistence of homological features in the sensor signal over time.

At block 224, a difference between the topological representation (generated at block 222) and a prior topological representation is determined. The prior topological representation at block 224 can include the topological representation generated on the input signal, during a prior time period that precedes the time period for which the topological representation is generated at block 222. Accordingly, block 224 determines whether the topological representation (e.g., a persistence diagram generated from the topological representation) is significantly different than previous historical operation of the machine. In another example, the prior topological representation can include the reference models obtained at block 204.

Illustratively, a persistence diagram models the persistence of feature(s) from the input signal(s) over varying spatial resolutions. This can further facilitate the evaluation of the topology of the data at varying spatial resolutions to identify which features remain/persist. Features which persist can be considered prominent and therefore can, in examples, represent a core structure to the data. The persistence diagram illustrates that persistent structure and can be evaluated to determine when that structure deteriorates or changes significantly by comparing to previous persistence diagrams in time.

At block 226, the operation determines whether an anomaly is detected. The anomaly can be detected based on whether the distance or difference determined at block 224 exceeds the threshold determined at block 206. That is, block 226 determines whether the difference between the input signal received at block 210 and the historical operation of the machine is significant enough so as to surpass the threshold. If not, operation returns to block 210 where a topological representation for a subsequent input signal is generated.

If block 226 detects an anomaly, block 228 compares the topological representation to the reference model(s) obtained at block 204. If a corresponding (e.g., matching) model is found at block 230, mapping information (e.g., mappings 183) are used to access a corresponding anomaly record 184, that corresponds to the reference model. This is represented at block 232. For example, a matching reference model, matched to the topological representation, can indicate that a wear condition is present. In another example, the anomaly record can indicate that improper machine settings are being utilized. In either case, at block 234, the cause of the anomaly and/or any corrective actions are determined.

If a corresponding model is not found at block 230, the topological representation generated at block 222 can be stored as a reference model. This is represented at block 236. At block 238, a cause of the anomaly and corrective actions can be determined. This can be done automatically by system 148, based on user input, such as input from operator 108, remote user 118, etc., or otherwise. An anomaly record (e.g., 184) is generated for the anomaly, and is mapped to the newly generated reference model. This is represented at block 240.

At block 242, control signal generator logic 155 generates a control signal to control machine 102 based on the cause of the anomaly and/or any corrective actions determined at blocks 234/238. For example, control systems can automatically control the corresponding controllable subsystems 106, for example to implement settings changes, stop operation of the machine, etc. This is represented at block 244. In another example, an indication can be displayed to operator 108 and/or remote user 118. This is represented at block 246. Of course, the machine can be controlled in other ways as well. This is represented at block 248.

Figure 4:
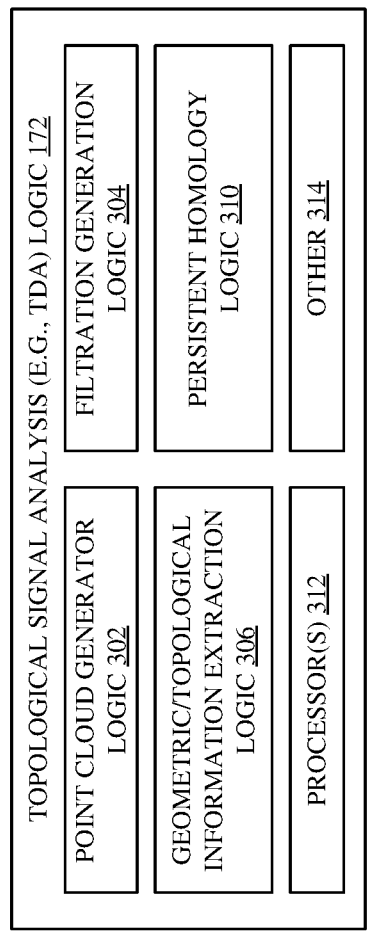
FIG. 4 is a block diagram of one example of topological signal analysis logic configured to perform topological data analysis on signal from a sensor on a mobile work machine.

FIG. 4 illustrates one example of topological signal analysis logic 172, configured to perform topological data analysis (TDA) on signal 171. Briefly, topological data analysis is a signal analysis method that can infer high-dimension structure from low-dimension representations, and assemble discreet points into a global structure. Illustratively, one example of TDA replaces a set of data points with a family of simplicial complexes, indexed by a proximity parameter, and analyzes these topological complexes via algebraic topology, e.g., via persistent homology. The persistent homology of a data set is encoded by way of a topology data function, referred to a persistence diagram or barcode. TDA analyzes point cloud data sensed from a geometric point of view.

Figure 5:
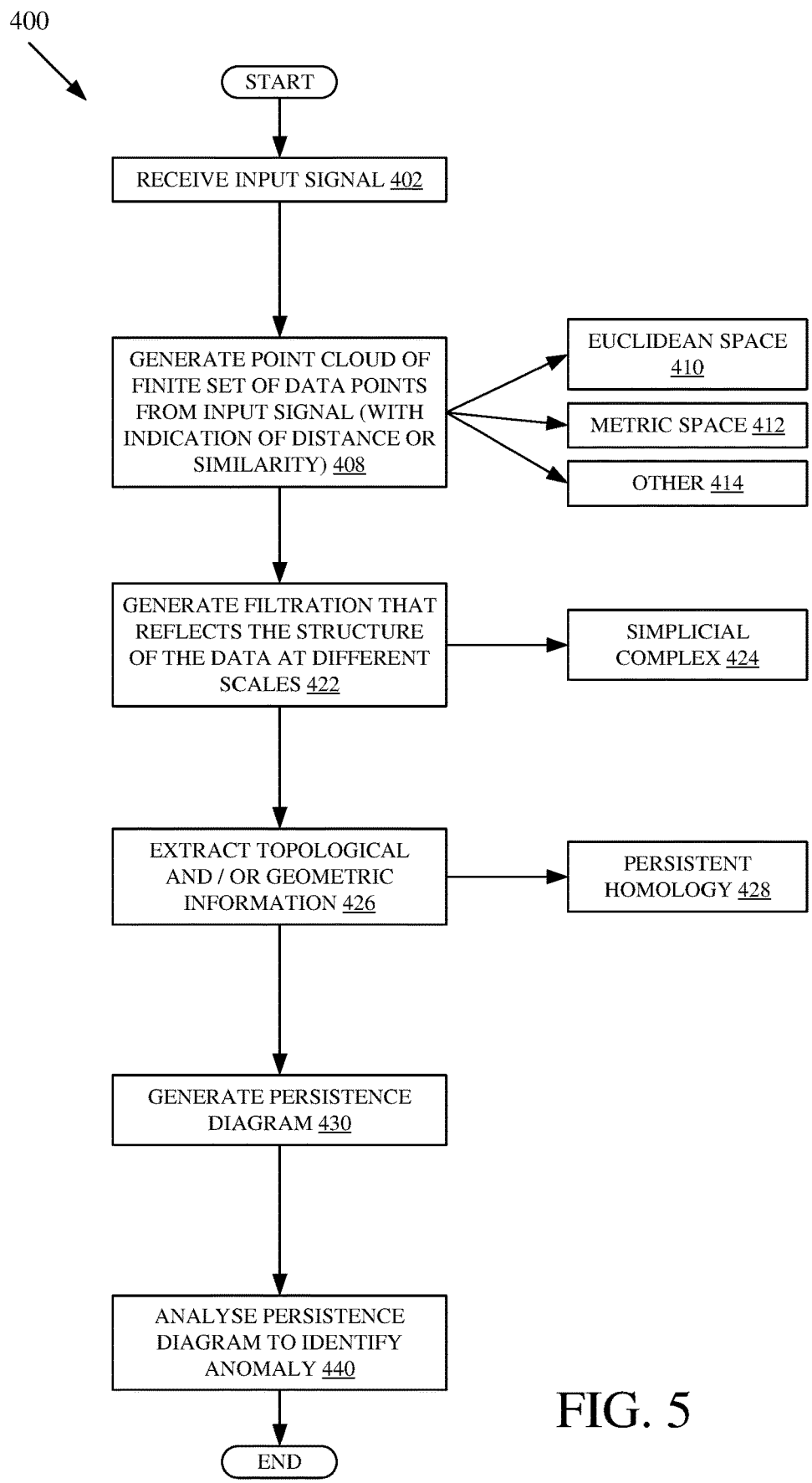
FIG. 5 is a flow diagram illustrating one example of topological data analysis performed on an input signal from sensors of a mobile work machine.

In the example shown in FIG. 4, logic 172 includes point cloud generator logic 302, filtration generation logic 304, geometric/topological information extraction logic 306, and persistent homology logic 310. Logic 172 is also illustrated as including one or more processors 312, and can include other items 314 as well. FIG. 5 is a flow diagram 400 illustrating one example operation of logic 172, shown in FIG. 4.

Figure 6A:
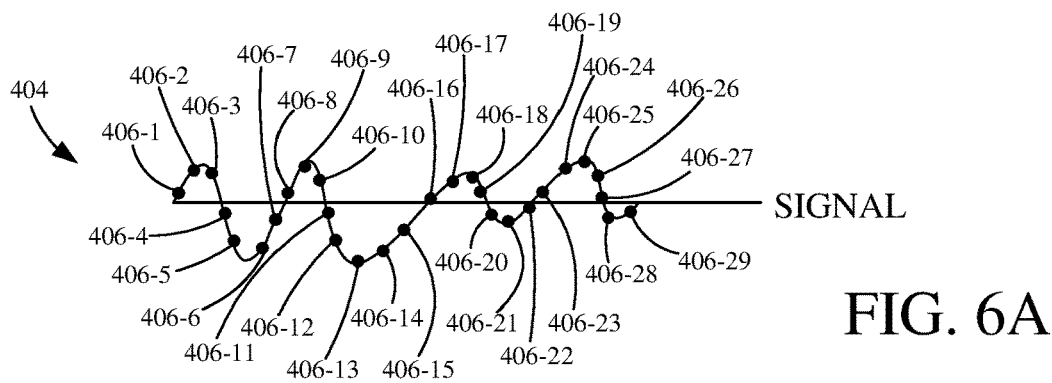
FIG. 6A illustrates an example input signal received from a machine sensor.

At block 402, an input signal is received by logic 172. One example of an input signal 404 is illustrated in FIG. 6A. As shown in FIG. 6A, signal 404 comprises a time series of feature values, represented by points 406-1, 406-2, etc. These points are collectively referred to as points 406. Input signal 404 can be received from any of a variety of sensors on or associated with machine 102, such as sensor(s) 124. It is noted that input signal 404 can be received from a single sensor, or it can be a combination of signals received from a number of sensors. In the illustrated example, input signal 404 comprises a signal from accelerometers 142, indicating vibration of a component of machine 102. As shown, input signal 404 has an amplitude or frequency (or other characteristic) that changes over time. It may be that in some scenarios, a single characteristic (such as amplitude) may not provide an adequate indication of normal or abnormal operation. The topological signal analysis discussed below identifies changes to signal 404 that are beyond a threshold, based on the geometry of signal 404. This allows for detecting additional characteristics of signal 404, which may not otherwise be identifiable using the above techniques.

Points 406 have a notion of distance or similarity between them. This distance can be induced by a metric in an ambient space or as an intrinsic metric defined by a pairwise distance matrix. This distance matrix allows for hierarchical clustering, to represent the distances between the feature values represented by points 406 and input signal 404.

Figure 6B:
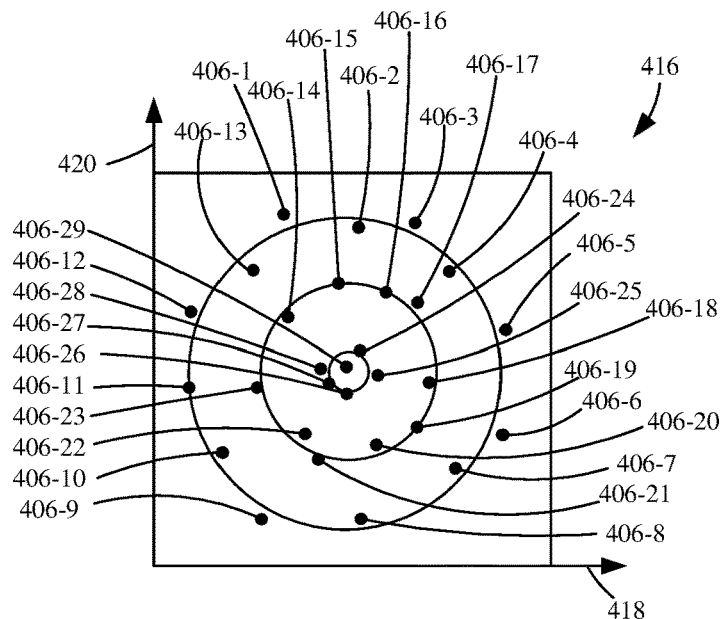
FIG. 6B illustrates an example metric space representing the input signal shown in FIG. 6A.

Referring again to FIG. 5, at block 408, a point cloud of a finite set of data points is generated from input signal 404. The point cloud generated at block 408 includes an indication of distance or similarity of points 406. This can be done in any of a number of ways. In one example, point cloud generator logic 302 generates a point cloud from points 406 in a Euclidean space. This is represented at block 410. In one example, the point cloud is generated in a metric space. This is represented by block 412. Of course, the point cloud can be generated in other ways as well. This is represented by block 414. FIG. 6B illustrates one example of a point cloud 412 generated from points 406 in a metric space.

As shown in FIG. 6B, metric space 416 models the points 406 using metric variables 418 and 420, represented by the x and y axis in FIG. 6B, respectively. The metric variables 418 and 420 can represent any of a wide variety of different types of variables or characteristics of the input signal, for plotting points 406 in metric space 416. For instance, these variables can represent amplitude changes, frequency changes, to name a few. Points 406 are plotted in concentric circles, which represent the similarity and dissimilarity between groups of points 406.

Referring again to FIG. 5, at block 422, logic 304 generates a filtration that reflects the structure of the data at different scales. In one example, block 422 generates a set of simplicial complexes. This is represented at block 424. Examples include, but are not limited to, Cech or Vietoris-Rips complexes.

At block 426, logic 306 extracts topological and/or geometric information. This is based on the structure reflected in the metric space 416. In one example a metric or distance function comprises a function that defines a distance between each pair of elements of a set. The extracted topological and/or geometric information provides additional features and descriptors of the data that can be analyzed to determine performance of the machine component, that input signal 404 represents. In one example, this information is extracted using persistent homology. This is represented at block 428.

Figure 6C:
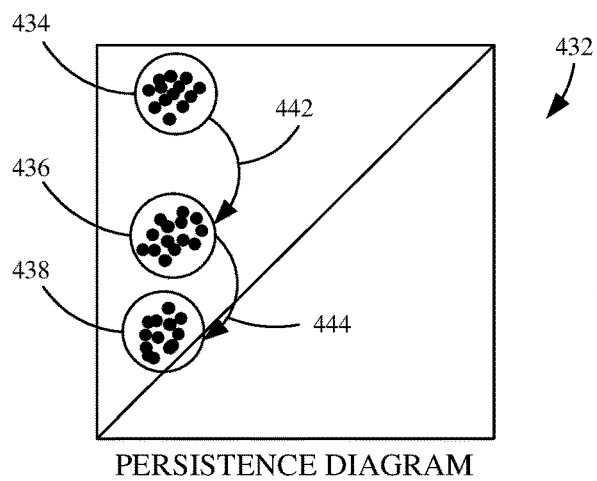
FIG. 6C illustrates an example persistence diagram generated from the metric space shown in FIG. 6B.

From this extracted information, a persistence diagram is generated at block 430. One example persistence diagram 432 is illustrated in FIG. 6C. As shown a first set of the data points 406 are clustered. This is represented at reference numeral 434. The points in cluster 434 comprise the data points 406-1 to 406-13, which reside along the outermost concentric circle in FIG. 6B. A second set of data points are plotted on the persistence diagram 432. This is represented at reference numeral 436. This cluster 436 of data points illustratively represents data points 406-14 to 406-23, plotted on the second concentric circle in the metric space 416. A third set of data points, represented at reference numeral 438, are plotted on the persistence diagram 432 and represent data points 406-24 to 406-29. These data points were located along the innermost concentric circle in metric space 416.

At block 440, persistence diagram 432 is analyzed to identify or detect an anomaly. In the example of FIG. 6C, the analysis determines that the positioning of clusters 434, 436, and 438 (represented by arrows 442 and 444), indicate that signal 404 has degraded, which is represented by the downward movement of the clusters in the persistence diagram 432. In one example, using persistence diagram 432, logic 310 determines that the phase of signal 404 is shifting, and can identify when this shift can result in a significant deviation so as to be characterized as an anomaly. In one example, block 440 determines that this downward movement of the clusters indicates a threshold change in the signal, which triggers a determination that an anomalous operating condition is present.

The persistence diagram 432 can be compared to reference model(s) to identify a cause of the anomaly, as noted above. For instance, a reference model can model downward movement of the clusters in the persistence diagram 432 relative a particular anomalous operation condition. In one particular example of a cold miller, persistence diagram 432 is compared to a reference model that models the shape of a persistence diagram when a worn tooth condition is present. By matching diagram 432 against this reference model, system 148 determines that machine 100 is experience the worn tooth condition.

In one example, the reference model includes a persistence diagram representing a reference operation of machine 100. For instance, this persistence diagram can be generated based on a reference operation of machine 100 during a prior time period. In one example, this reference operation is from the current pass over the field being made by machine 100. In any case, a distance between persistence diagram 432 and the persistence diagram modeling the reference operation can be computed, to obtain an indication of a change in the structure or topology of the input signal. In one example, the Wasserstein distance between the two persistence diagrams (i.e., the current persistence diagram 432 and the prior persistence diagram) is computed.

To illustrate, an example persistence diagram includes a multiset of points in $$\Delta(:=\{(u,v)\in \mathbb{R}^2 | u, v \geq 0, u \leq v\})$$

Further, the Wasserstein distance between two persistence diagrams X and Y is defined as $$W_p[L_q](X, y) := \inf_{\varphi: X \to Y} \left[ \sum_{x \in X} \|x - \varphi(x)\|_q \right]^{1/p}$$

where $1 \leq p$, $q \leq \infty$ and $\varphi$ ranges over bijections between X and Y.

If the computed distance exceeds a threshold, logic 173 detects that an anomalous operation condition is present. Alternatively, or in addition, the persistence diagram 432 can be processed further, or output to other systems for processing, to detect characteristics of signal 404 indicative of operational performance of machine 102.

Figure 7:
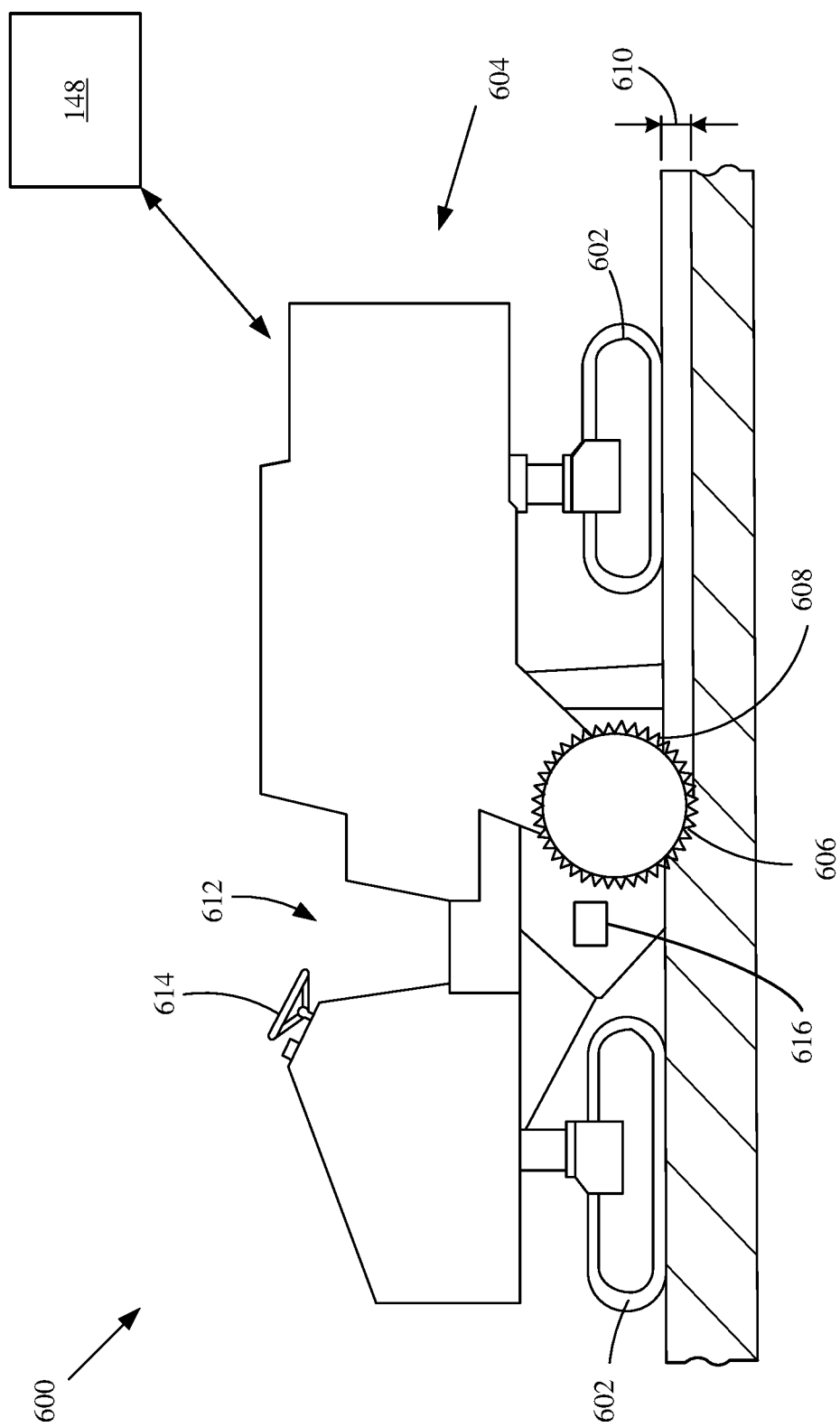
FIG. 7 is a diagrammatic view of one example of a mobile work machine in the form of an asphalt cold miller.

As noted above, mobile work machine 102 can comprise any of a wide variety of different types of mobile work machines. FIG. 7 illustrates one example of a mobile work machine 600 in the form of a cold asphalt miller. Machine 600 includes a plurality of ground-engaging traction elements 602, illustratively front and rear tracks. A machine frame 604 is supported on element 602 and includes a milling drum 606 having a set of milling teeth 608. Milling drum 606 is set at a milling depth 610. Machine 600 can also include an operator's cab or compartment 612 having a steering system, including a steering wheel 614, Machine 600 illustratively includes one or more vibration sensors 616 mounted on machine 600 to detect vibration caused by milling drum 606. The signals from vibration sensor(s) 616 received by machine performance detection system 148, and utilized to identify operational anomalies, such as worn milling teeth, incorrect machine settings, etc.

Figure 8:
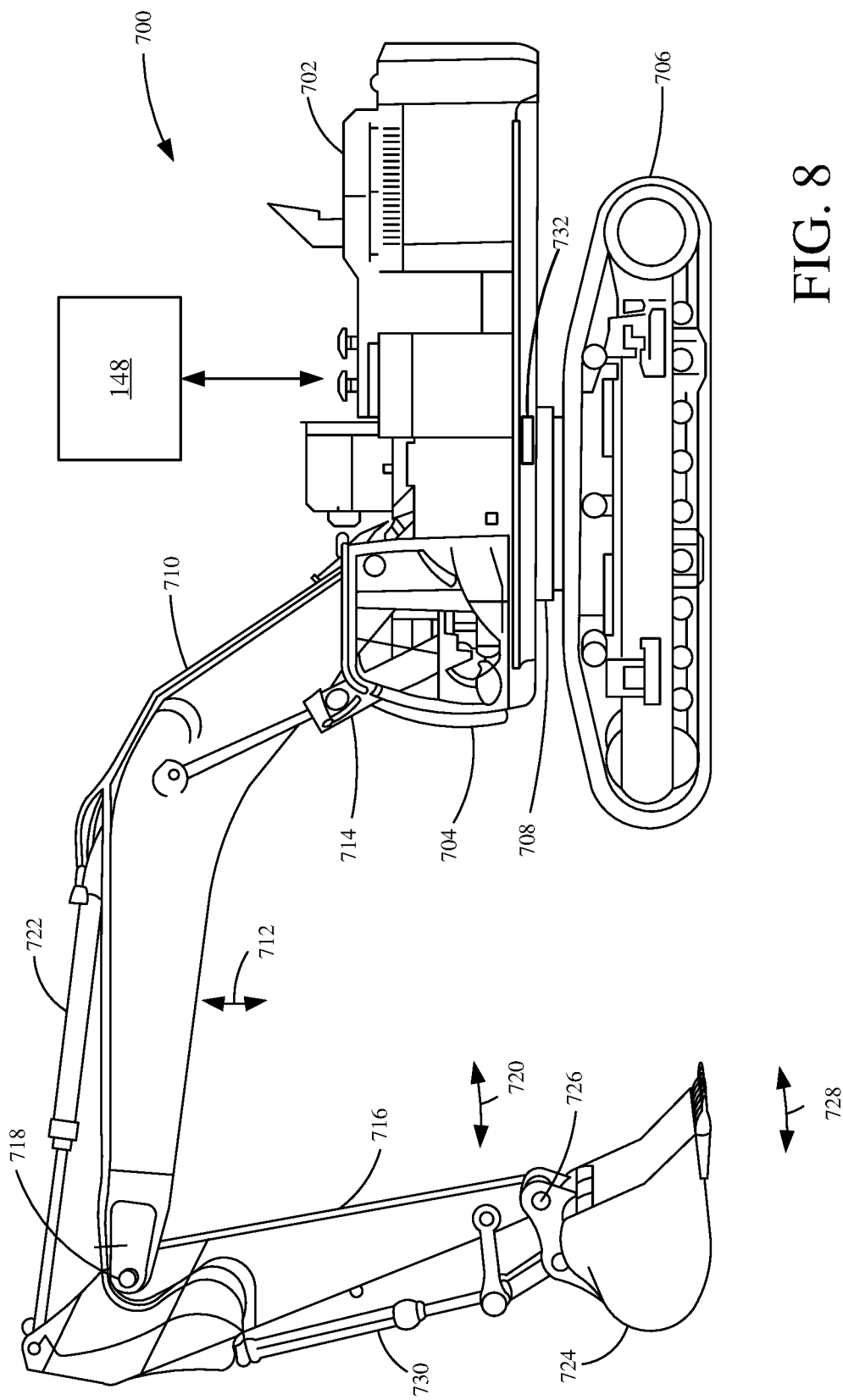
FIG. 8 is a diagrammatic view of one example of a mobile work machine in the form of an excavator.

FIG. 8 is a diagrammatic view of an example excavator 700. Excavator 700 includes a house 702 having an operator cab 704 rotatably disposed above tracked portion 706. House 702 may rotate three hundred and sixty degrees about tracked portion 706 via rotatable coupling 708. Rotatable coupling 708 can include a swing bearing, among other components. A boom 710 extends from house 702 and can be raised or lowered in the direction indicated by arrow 712 based upon actuation of hydraulic actuator 714. A stick 716 is pivotably connected to boom 710 via joint 718 and is movable in the directions of arrows 720 based upon actuation of hydraulic cylinder 722. Bucket 724 is pivotably coupled to stick 716 at joint 726 and is rotatable in the directions of arrows 728 about joint 726 based on actuation of hydraulic cylinder 730.

In the illustrated example, one or more vibration sensors 732 are mounted on excavator 700 (for example on house 702 proximate rotatable coupling 708) and configured to detect vibration of machine 102 caused by rotation of house 702 relative to tracked portion 706. The signals from vibration sensor(s) 732 are provided as an input signal to machine performance detection system 148. System 148 can determine that the swing bearing of rotatable coupling 708 is worn based on topological analysis of the input signal from vibration sensor 732.

Figure 9:
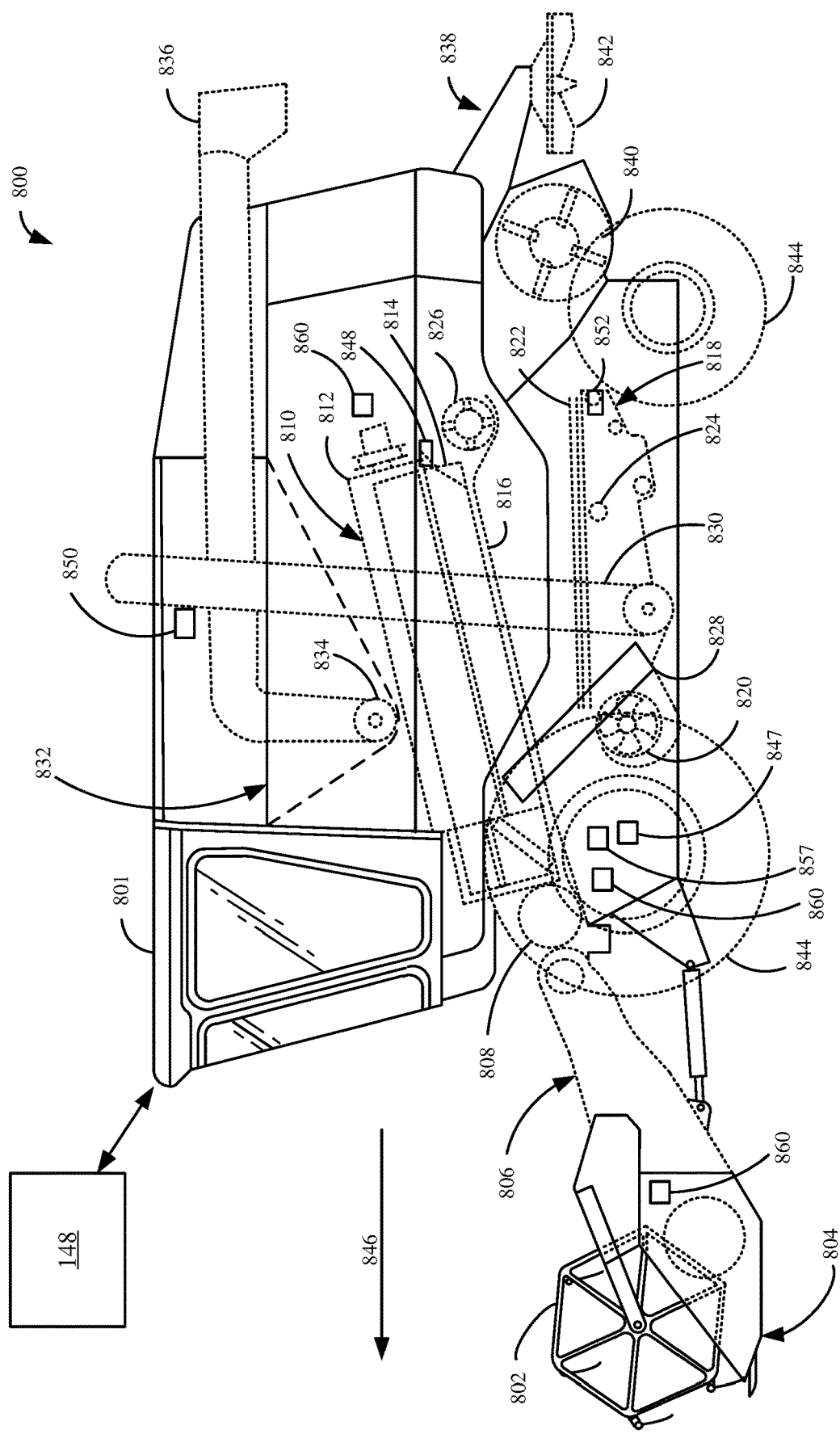
FIG. 9 is a diagrammatic view of one example of a mobile work machine in the form of combine harvester.

FIG. 9 is a diagrammatic view of one example of a mobile work machine in the form of combine 800. It can be seen in FIG. 9 that combine 800 illustratively includes an operator compartment 801, which can have a variety of different operator interface mechanisms, for controlling combine 800, as will be discussed in more detail below. Combine 800 can include a set of front end equipment that can include header 802, and a cutter generally indicated at 804. It can also include a feeder house 806, a feed accelerator 808, and a thresher generally indicated at 810. Thresher 810 illustratively includes a threshing rotor 812 and a set of concaves 814. Further, combine 800 can include a separator 816 that includes a separator rotor. Combine 800 can include a cleaning subsystem (or cleaning shoe) 818 that, itself, can include a cleaning fan 820, chaffer 822 and sieve 824. The material handling subsystem in combine 800 can include (in addition to a feeder house 806 and feed accelerator 808) discharge beater 826, tailings elevator 828, clean grain elevator 830 (that moves clean grain into clean grain tank 832) as well as unloading auger 834 and spout 836. Combine 800 can further include a residue subsystem 838 that can include chopper 840 and spreader 842. Combine 800 can also have a propulsion subsystem that includes an engine (or other power source) that drives ground engaging wheels 844 or tracks, etc.

In operation, and by way of overview, combine 800 illustratively moves through a field in the direction indicated by arrow 846. As it moves, header 802 engages the crop to be harvested and gathers it toward cutter 804. After it is cut, it is moved through a conveyor in feeder house 806 toward feed accelerator 808, which accelerates the crop into thresher 810. The crop is threshed by rotor 812 rotating the crop against concave 814. The threshed crop is moved by a separator rotor in separator 816 where some of the residue is moved by discharge beater 826 toward the residue subsystem 838. It can be chopped by residue chopper 840 and spread on the field by spreader 842.

Grain falls to cleaning shoe (or cleaning subsystem) 818. Chaffer 822 separates some of the larger material from the grain, and sieve 824 separates some of the finer material from the clean grain. Clean grain falls to an auger in clean grain elevator 830, which moves the clean grain upward and deposits it in clean grain tank 832. Residue can be removed from the cleaning shoe 818 by airflow generated by cleaning fan 820. That residue can also be moved rearwardly in combine 800 toward the residue subsystem 838. Tailings can be moved by tailings elevator 828 back to thresher 810 where they can be re-threshed.

FIG. 9 also shows that, in one example, combine 800 can include ground speed sensor 847, one or more separator loss sensors 848, a clean grain camera 850, and one or more cleaning shoe loss sensors 852. Ground speed sensor 847 illustratively senses the travel speed of combine 800 over the ground. This can be done by sensing the speed of rotation of the wheels, the drive shaft, the axel, or other components. The travel speed and position of combine 800 can also be sensed by a positioning system 857, such as a global positioning system (GPS), a dead reckoning system, a LORAN system, or a wide variety of other systems or sensors that provide an indication of travel speed.

Combine 800 can include one or more vibration sensors 860 mounted at various location son combine 800 and configured to detect vibrations caused by operation of the various components on machine 800. For example, a vibration sensor 860 can be mounted on header 802 and generate an input signal indicative of operation of header 802. Also, a vibration sensor 860 can be mounted proximate wheels 844, thresher 810, or any other location on combine 800. The inputs from one or more of the vibration sensors 860 can be provided as input signals to machine performance detection system 148, as illustrated in FIG. 9.

It can thus be seen that the present system provides a number of advantages. For example, but not by limitation, topological data analysis provides an automated way to detect when a signal from machine sensors has changed, for use in anomaly detection. Topological data analysis is based on the topography, or structure, of the data and uses geometric reasoning to structure the data, which allows increased quantification or qualification of the signal structure to capture operational data. The system provides stability and robustness against noise introduced into the system and is able to detect and/or visualize high-dimensional data. The system can identify wear conditions, incorrect or suboptimal machine settings, etc. through the topological representation of the input signal. This improves operation of the machine.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors, processing systems, controllers and/or servers. In one example, these can include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 10:
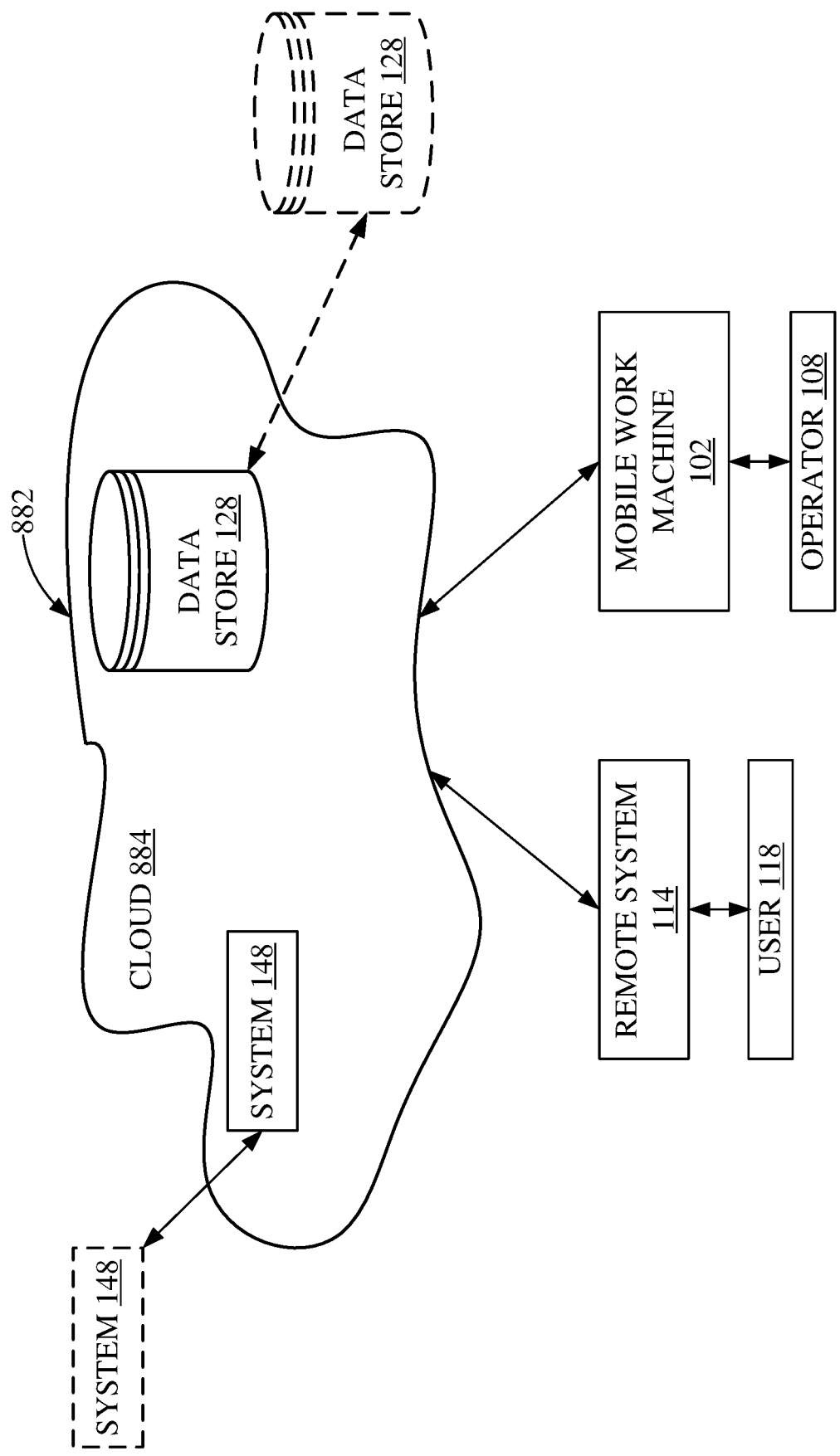
FIG. 10 is a block diagram showing one example of the architecture illustrated in FIG. 1, deployed in a remote server architecture.

FIG. 10 is a block diagram of one example of mobile work machine architecture 100, shown in FIG. 1, where mobile work machine 102 communicates with elements in a remote server architecture 882. In an example, remote server architecture 882 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 10, some items are similar to those shown in FIG. 1 and they are similarly numbered. FIG. 10 specifically shows that system 148 and/or data store 128 can be located at a remote server location 884. Therefore, mobile work machine 102 accesses those systems through remote server location 884.

FIG. 10 also depicts another example of a remote server architecture. FIG. 10 shows that it is also contemplated that some elements of FIG. 1 are disposed at remote server location 884 while others are not. By way of example, data store 128 can be disposed at a location separate from location 884, and accessed through the remote server at location 884. Alternatively, or in addition, system 148 can be disposed at location(s) separate from location 884, and accessed through the remote server at location 884.

Regardless of where they are located, they can be accessed directly by mobile work machine 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the mobile work machine comes close to the fuel truck for fueling, the system automatically collects the information from the machine or transfers information to the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the mobile work machine until the mobile work machine enters a covered location. The mobile work machine, itself, can then send and receive the information to/from the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
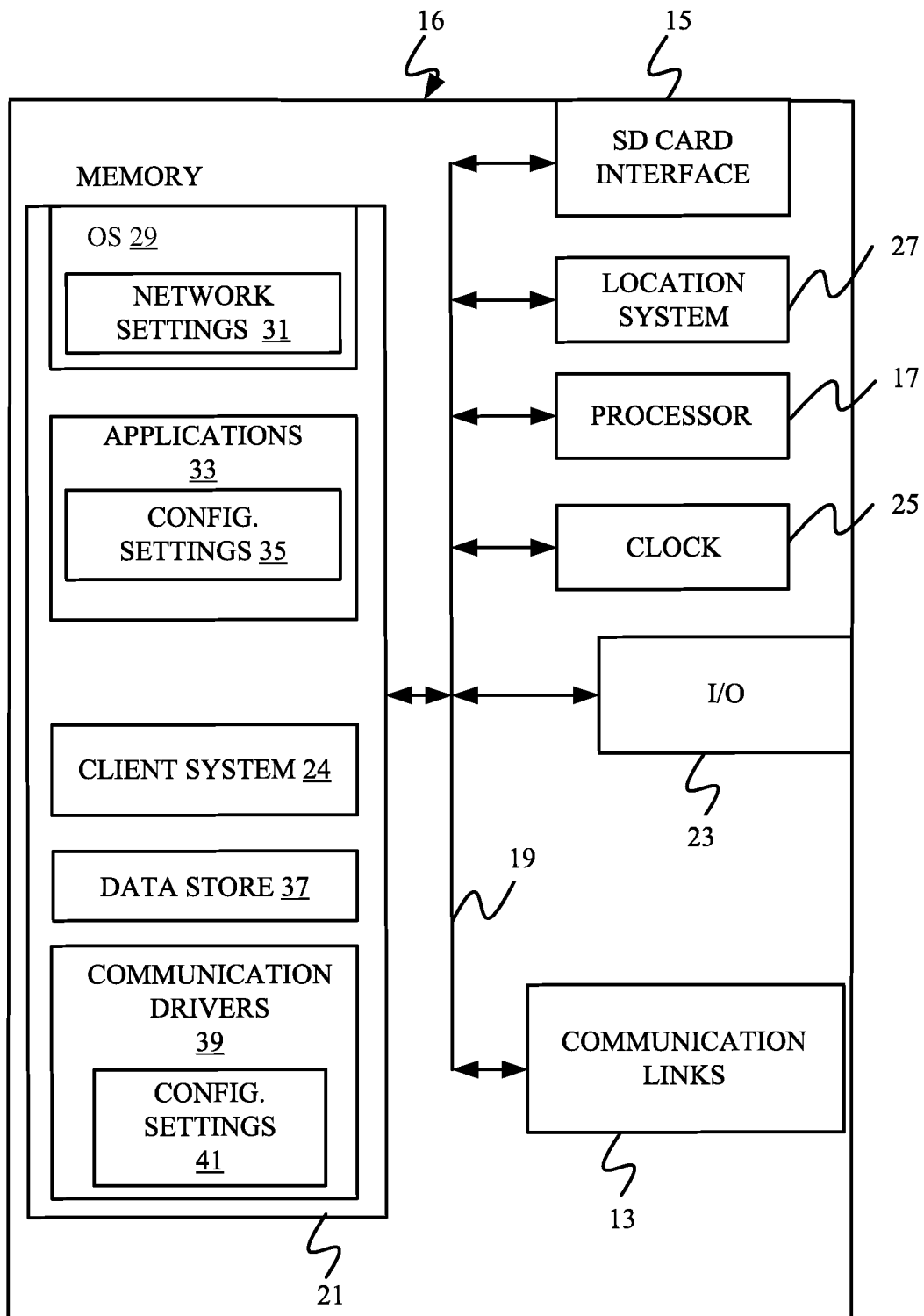
FIGS. 11-13 show examples of mobile devices that can be used in the architectures shown in the previous figures.

FIG. 11 is a simplified block diagram of one illustrative example of a handheld or mobile computing device that can be used as a user's or client's hand held device 16, in which the present system (or parts of it) can be deployed. For instance, a mobile device can be deployed in the operator compartment of mobile work machine 102 or as remote system 114. FIGS. 17-18 are examples of handheld or mobile devices.

FIG. 11 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Figure 12:
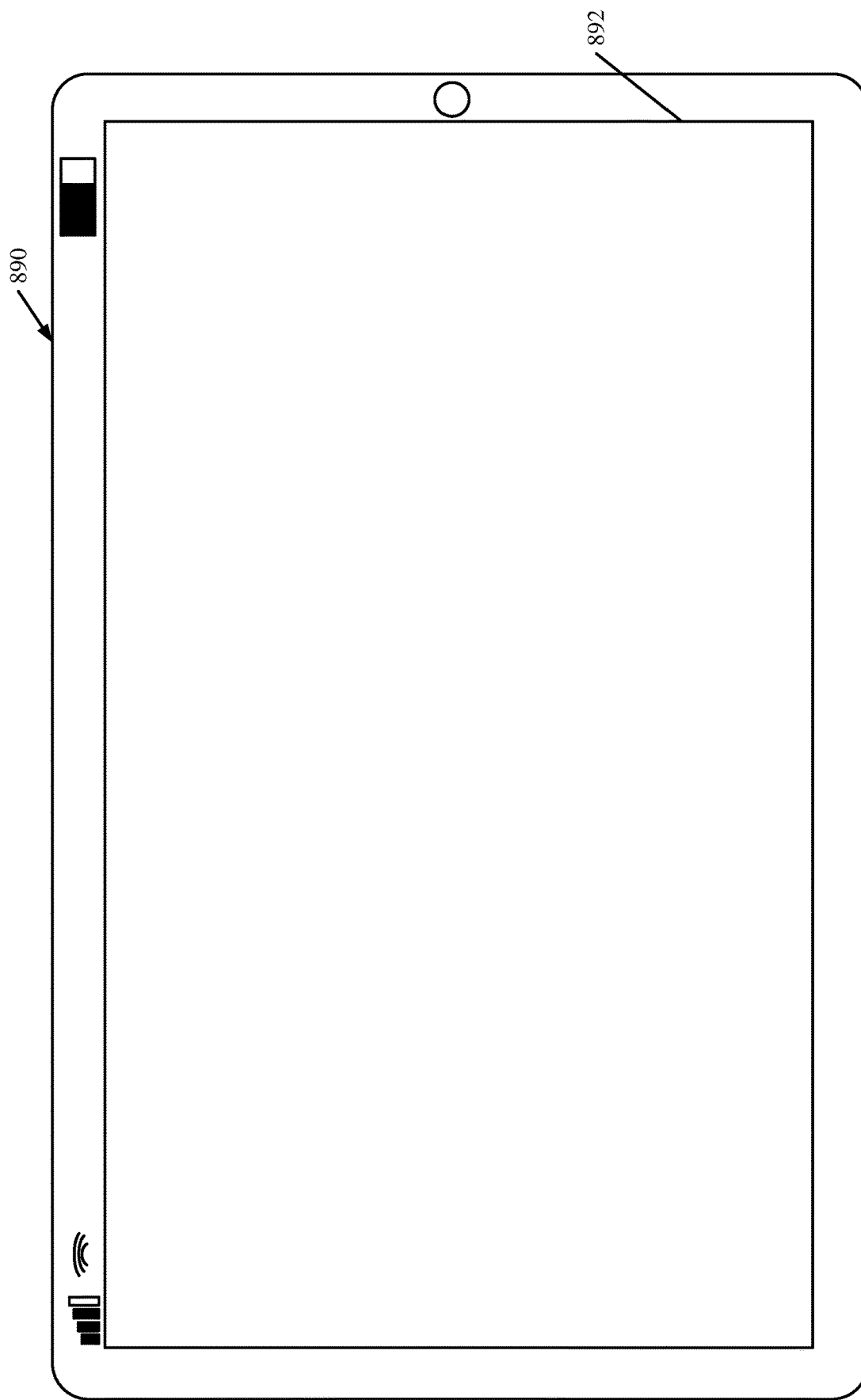

FIG. 12 shows one example in which device 16 is a tablet computer 890. In FIG. 12, computer 890 is shown with user interface display screen 892. Screen 892 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 890 can also illustratively receive voice inputs as well.

Figure 13:
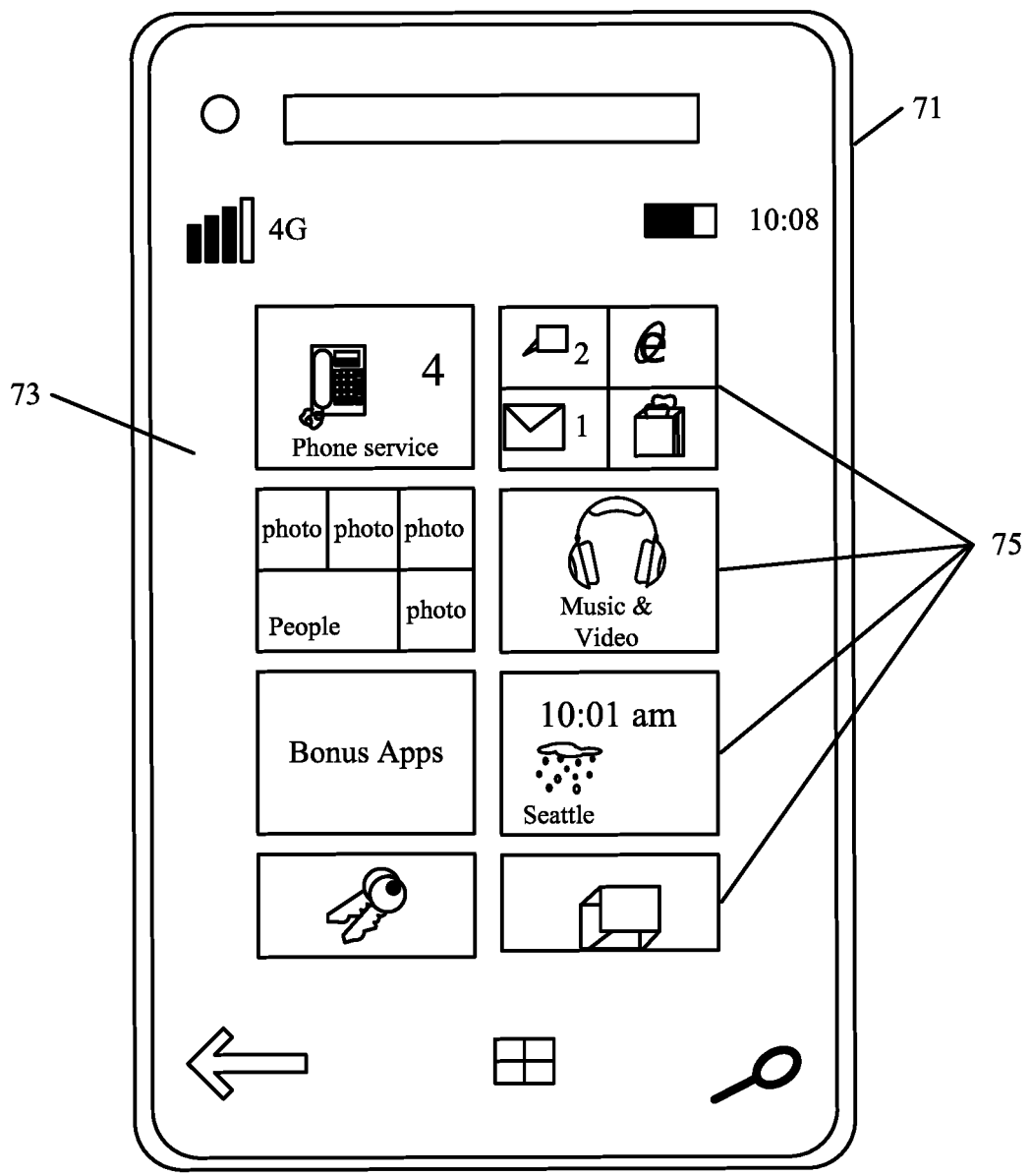

FIG. 13 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
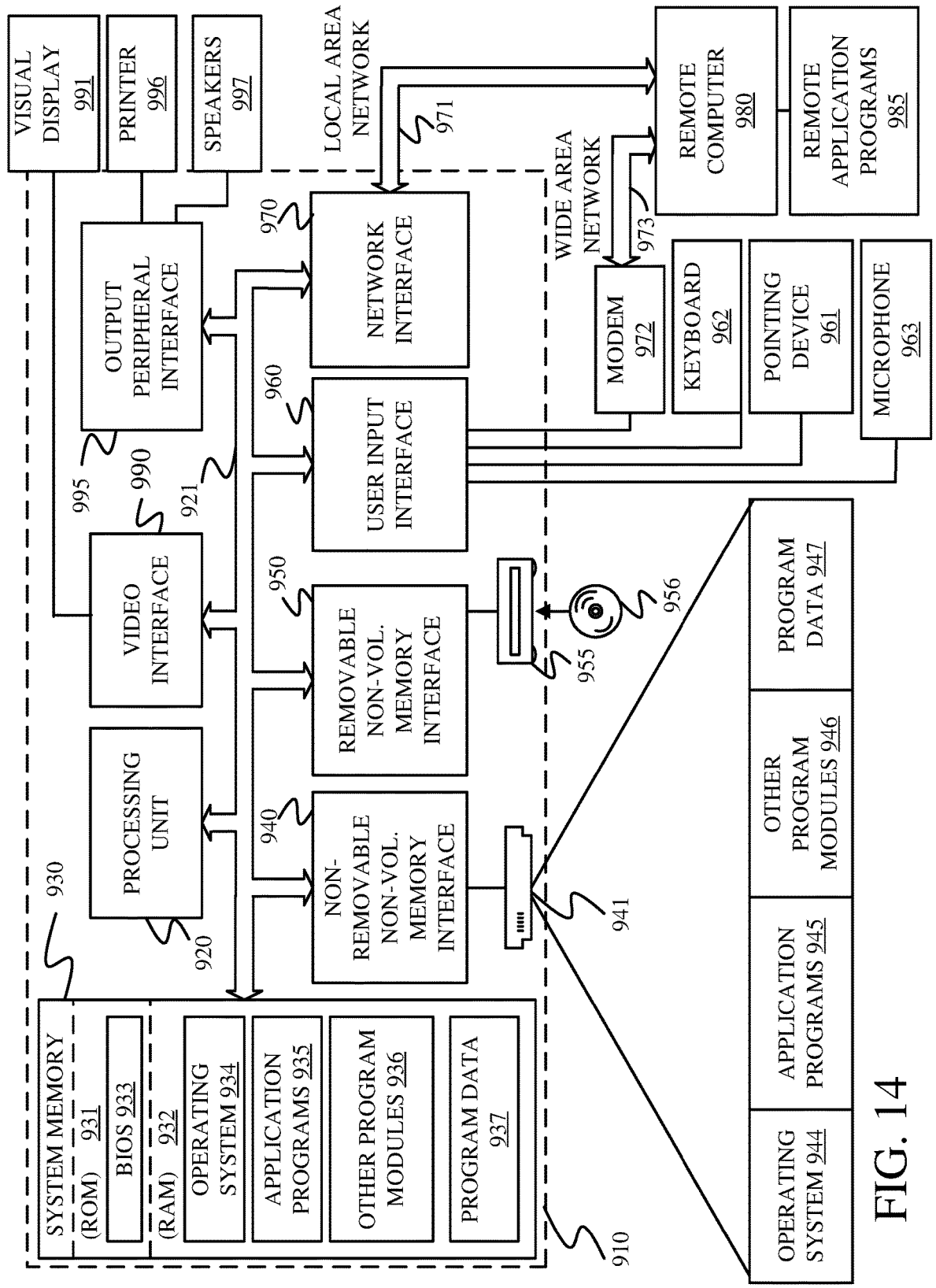
FIG. 14 is a block diagram showing one example of a computing environment that can be used in the architectures shown in the previous figures.

FIG. 14 is one example of a computing environment in which elements of FIG. 1, or parts of it, (for example) can be deployed. With reference to FIG. 14, an example system for implementing some embodiments includes a computing device in the form of a computer 910. Components of computer 910 may include, but are not limited to, a processing unit 920 (which can comprise processors or servers from previous FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 1 can be deployed in corresponding portions of FIG. 14.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 14 illustrates operating system 934, application programs 935, other program modules 936, and program data 937.

The computer 910 may also include other removable/non-removable volatile/nonvolatile computer storage media. By way of example only, FIG. 14 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 is typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 910. In FIG. 14, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a local area network—LAN, or wide area network—WAN or a controller area network—CAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 14 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Example 1 is a mobile work machine comprising:
a sensor configured to generate a sensor signal indicative of operation of the mobile work machine;
a machine performance detection system configured to:
receive the sensor signal;
generate a topological representation of the sensor signal; and
determine a machine performance characteristic based on the topological representation relative to a reference model; and
a control system configured to generate a control signal to control the mobile work machine based on the machine performance characteristic.

Example 2 is the mobile work machine of any or all previous examples, wherein the sensor signal is indicative of operation of the mobile work machine during a given time period, and the reference model comprises a topological representation of the sensor signal generated by the sensor during a prior time period that precedes the given time period.

Example 3 is the mobile work machine of any or all previous examples, wherein the topological representation models a shape of the sensor signal over time.

Example 4 is the mobile work machine of any or all previous examples, wherein the sensor signal defines a time series of feature values, and generating the topological representation comprises applying a topological data analysis algorithm to the time series of feature values.

Example 5 is the mobile work machine of any or all previous examples, wherein the topological data analysis algorithm generates a persistence model that models persistence of homological features in the sensor signal over time.

Example 6 is the mobile work machine of any or all previous examples, wherein the persistence model is generated using persistent homology.

Example 7 is the mobile work machine of any or all previous examples, wherein the feature values represent acceleration of the mobile work machine in one or more directions.

Example 8 is the mobile work machine of any or all previous examples, wherein the machine performance detection system is configured to apply a distance function between the topological representation and the reference model.

Example 9 is the mobile work machine of any or all previous examples, wherein the sensor signal is indicative of vibration of the mobile work machine.

Example 10 is the mobile work machine of any or all previous examples, wherein the sensor comprises an accelerometer.

Example 11 is the mobile work machine of any or all previous examples, wherein the sensor comprises a hydraulic pressure sensor.

Example 12 is the mobile work machine of any or all previous examples, wherein the sensor comprises a motor speed detector.

Example 13 is the mobile work machine of any or all previous examples, wherein the sensor signal is indicative of an acoustic signal generated by the mobile work machine and detected by the sensor.

Example 14 is the mobile work machine of any or all previous examples, wherein the machine performance characteristic comprises a wear indicator indicative of wear of one or more machine components.

Example 15 is the mobile work machine of any or all previous examples, wherein the reference model is mapped to a machine anomaly record that identifies an anomalous machine operating condition.

Example 16 is a method performed by a computing system associated with a mobile work machine, the method comprising:
receiving, from a sensor associated with the mobile work machine, a sensor signal indicative of operation of the mobile work machine;
generating a topological representation of the sensor signal;
determining a machine performance characteristic based on the topological representation relative to a reference model; and
generating a control signal to control the mobile work machine based on the machine performance characteristic.

Example 17 is the method of any or all previous examples, wherein the sensor signal is indicative of operation of the mobile work machine during a given time period, and the reference model comprises a topological representation of the sensor signal generated by the sensor during a prior time period that precedes the given time period.

Example 18 is the method of any or all previous examples, wherein
the sensor signal defines a time series of feature values, and
generating the topological representation comprises applying a topological data analysis algorithm to the time series of feature values to model persistence of the feature values over time.

Example 19 is a computing system for a mobile work machine, the computing system comprising:
at least one processor; and
memory storing instructions executable by the at least one processor, wherein the instructions, when executed, cause the computing system to:
receive a sensor signal that defines a time series of feature values;
generate a topological representation that models a shape of the sensor signal over time by applying a topological data analysis algorithm to the time series of feature values;
determine a machine performance characteristic based on the topological representation relative to a reference model; and
generate a control signal to control the mobile work machine based on the machine performance characteristic Example 20 is the computing system of any or all previous examples, wherein the instructions, when executed, cause the computing system to:
generate a persistence model that models persistence of homological features in the sensor signal over time; and
determine the machine performance characteristic based on the persistence model.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile work machine comprising:
a sensor configured to generate a sensor signal indicative of operation of the mobile work machine;
a machine performance detection system configured to:
receive the sensor signal;
generate a topological representation of the sensor signal; and
determine a machine performance characteristic based on the topological representation relative to a reference model; and
a control system configured to generate a control signal to control the mobile work machine based on the machine performance characteristic.

2. The mobile work machine of claim 1, wherein the sensor signal is indicative of operation of the mobile work machine during a given time period, and the reference model comprises a topological representation of the sensor signal generated by the sensor during a prior time period that precedes the given time period.

3. The mobile work machine of claim 1, wherein the topological representation models a shape of the sensor signal over time.

4. The mobile work machine of claim 3, wherein the sensor signal defines a time series of feature values, and generating the topological representation comprises applying a topological data analysis algorithm to the time series of feature values.

5. The mobile work machine of claim 4, wherein the topological data analysis algorithm generates a persistence model that models persistence of homological features in the sensor signal over time.

6. The mobile work machine of claim 5, wherein the persistence model is generated using persistent homology.

7. The mobile work machine of claim 4, wherein the feature values represent acceleration of the mobile work machine in one or more directions.

8. The mobile work machine of claim 3, wherein the machine performance detection system is configured to apply a distance function between the topological representation and the reference model.

9. The mobile work machine of claim 1, wherein the sensor signal is indicative of vibration of the mobile work machine.

10. The mobile work machine of claim 9, wherein the sensor comprises an accelerometer.

11. The mobile work machine of claim 9, wherein the sensor comprises a hydraulic pressure sensor.

12. The mobile work machine of claim 9, wherein the sensor comprises a motor speed detector.

13. The mobile work machine of claim 1, wherein the sensor signal is indicative of an acoustic signal generated by the mobile work machine and detected by the sensor.

14. The mobile work machine of claim 1, wherein the machine performance characteristic comprises a wear indicator indicative of wear of one or more machine components.

15. The mobile work machine of claim 1, wherein the reference model is mapped to a machine anomaly record that identifies an anomalous machine operating condition.

16. A method performed by a computing system associated with a mobile work machine, the method comprising:
receiving, from a sensor associated with the mobile work machine, a sensor signal indicative of operation of the mobile work machine;

generating a topological representation of the sensor signal;

determining a machine performance characteristic based on the topological representation relative to a reference model; and generating a control signal to control the mobile work machine based on the machine performance characteristic.

17. The method of claim 16, wherein the sensor signal is indicative of operation of the mobile work machine during a given time period, and the reference model comprises a topological representation of the sensor signal generated by the sensor during a prior time period that precedes the given time period.

18. The method of claim 16, wherein the sensor signal defines a time series of feature values, and generating the topological representation comprises applying a topological data analysis algorithm to the time series of feature values to model persistence of the feature values over time.

19. A computing system for a mobile work machine, the computing system comprising:

at least one processor; and memory storing instructions executable by the at least one processor, wherein the instructions, when executed, cause the computing system to:

receive a sensor signal that defines a time series of feature values;

generate a topological representation that models a shape of the sensor signal over time by applying a topological data analysis algorithm to the time series of feature values;

determine a machine performance characteristic based on the topological representation relative to a reference model; and generate a control signal to control the mobile work machine based on the machine performance characteristic.

20. The computing system of claim 19, wherein the instructions, when executed, cause the computing system to:

generate a persistence model that models persistence of homological features in the sensor signal over time; and determine the machine performance characteristic based on the persistence model.

* * * * *